July 2, 1968    D. S. MITCHELL    3,390,468
DEVICE FOR ILLUSTRATING THE ATOMIC STRUCTURE OF ELEMENTS
Filed Oct. 12, 1965
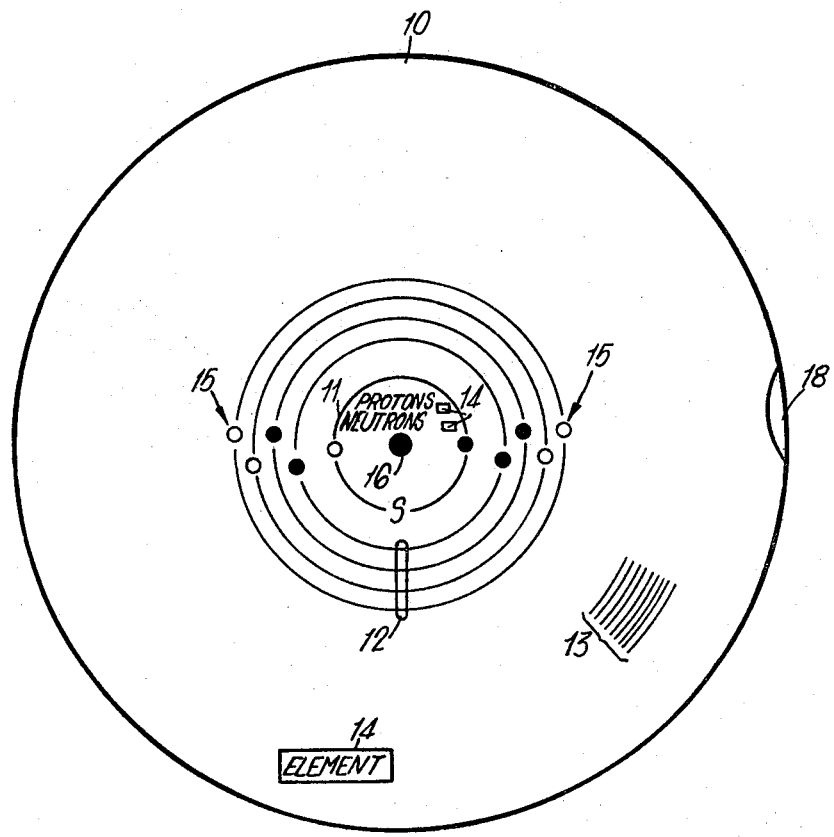
Inventor
DANIEL STEWART MITCHELL
By Young & Thompson
Attorneys 3,390,468
DEVICE FOR ILLUSTRATING THE ATOMIC
STRUCTURE OF ELEMENTS
Daniel S. Mitchell, 4 Overtoun Ave.,
Dumbarton, Scotland
Filed Oct. 12, 1965, Ser. No. 495,214
3 Claims. (Cl. 35—18)

This invention relates to a device for illustrating the atomic structure of elements, particularly for use in schools.

The device comprises two members interconnected by a central pivot to be capable of relative rotation, the first upper member being thin and having a flat upper surface on which are marked a series of circles representing electron orbits around a central nucleus and in which are provided two perforations in each circle and at least one window, and the second lower member having a flat upper surface on which are provided markings which co-operate with the perforation to represent electrons in the orbits and other information (e.g. the names of elements) which may be viewed through the window.

Preferably additional information regarding the number of neutrons and protons in an element may be provided on the surface of the lower member to be visible through additional windows in the upper member.

Preferably part of the central pivot connecting the upper and lower members represents the central nucleus.

An embodiment of the present invention will now be described by way of example, with reference to the accompanying drawing, which illustrates the embodiment.

Referring now to the drawing and device according to the present invention has an upper flat surface member 10 on which is marked a series of circles 11, 12 and 13, each series representing an orbital shell of an atom, and each circle representing an orbit of an electron. The upper member 10 is provided with windows 14 and each circle has two perforations 15 through which the appropriate information may be viewed.

The lower member 18 comprises a number of markings and information set out in a pattern such that when the said member is rotated the markings appear at the perforations and the information appears at the windows of the upper member.

The central pivot 16 connecting the upper and lower members 10 and 15 is provided with an enlargement on the upper surface of the upper member 10 to represent the nucleus of the atom.

The first orbital shell 11, located on the upper member, around the nucleus of the atom which is indicated at the centre of the circle by the aforesaid enlargement, has a single orbit. This orbit is represented by a blue circle and has two diametrically opposed perforations 15 through which the orbiting electron or electrons may be viewed. The orbit is indicated to be an S type orbit.

The second orbital shell 12 comprises four orbits, an S type orbit represented by a blue circle and three P type orbits represented by three red circles, each of said circles being provided with two diametrically opposed perforations 15 through which the orbiting electrons may be viewed.

The third orbital shell 13 comprises the S type and P type orbits of the second shell plus five other orbits known as D type orbits represented by five green circles, each circle having two diametrically opposed perforations 15.

This shell is incomplete in the drawing for reasons of clarity. Similarly the fourth orbital shell which is not illustrated comprises the nine orbits of the third shell plus nine other orbits represented by purple circles. Three windows 14 are also located on the upper member 10 at which appear the name of an element and its corresponding number of protons and neutrons. The lower member 18 is provided with markings which represent the electrons of the atoms and other information set out in a pattern. The names of the elements are printed in order around the inside edge of the lower body member which is circular in shape and the number of protons and number of electrons belonging to the respective elements are arranged in two separate circles around the inside edge of the pattern formed by the markings. The markings representing orbiting electrons are of a colour which will show up clearly when the markings appear at the perforations. Thus when the lower member is rotated relative to the upper member of the name of an element and its corresponding number of protons and neutrons will appear at the windows provided in the upper member, e.g. when silicon appears at a window the number fourteen appears at the windows for displaying its number of protons and neutrons, and fourteen of the perforations provided on the upper member appear blanked out by the coloured markings. When the element zinc appears at one of the windows the number thirty appears at the window provided for protons, the number thirty-five appears at the window provided for neutrons, and thirty of the perforations appear blanked out by the coloured markings representing the orbiting electrons.

The invention therefore facilitates a method whereby information relating to the atomic structure of elements may be illustrated in a practical and convenient way. The present invention is adapted to give illustrated information concerning a number of elements ranging from hydrogen to rubidium but this may be varied as described. The information printed on the upper and lower members may also be varied by amplification or increased complexity.

The lower and upper member may be screwed onto a hard backed member for providing a suitable supporting means.

The lower member may be provided with a number of radial projections along its outside edge to provide a gripping means for rotating the said member, the number of projections corresponding to the number of illustrated elements.

I claim:
1. A device for illustrating the atomic structure of elements, comprising two coaxial members interconnected by a central pivot to be capable of relative rotation, the first upper member being thin and having a flat upper surface on which are marked a series of circles representing electron orbits around a central nucleus and in which are provided two perforations in each circle, said upper member also provided with at least one window, and the second lower member having a flat upper surface on which are provided markings which co-operate with the perforations to represent electrons in the orbits and other information identifying the elements which may be viewed through the window.

2. A device as claimed in claim 1, in which additional information regarding the number of neutrons and protons in an element may be provided on the surface of the lower member to be visible through additional windows in the upper member.

3. A device as claimed in claim 1, in which part of the central pivot connecting the upper and lower members represents the central nucleus of the atom.

References Cited

UNITED STATES PATENTS

| | | | |
|---|---|---|---|
| 2,477,179 | 7/1949 | Hart | 35—18 |
| 2,651,115 | 9/1953 | Davies | 35—18 X |
| 3,091,041 | 5/1963 | De Marolies | 35—18 |
| 3,147,557 | 9/1964 | Maris | 35—74 X |

EUGENE R. CAPOZIO, *Primary Examiner.*

H. S. SKOGQUIST, *Assistant Examiner.*